United States Patent Office 3,101,379
Patented Aug. 20, 1963

3,101,379
SYNTHESIS OF HEXANITROETHANE
John A. Gallaghan, Ben Lomond, and Wilmer L. Reed, Palo Alto, Calif., assignors to Lockheed Aircraft Corporation, Burbank, Calif.
No Drawing. Filed Jan. 4, 1961, Ser. No. 80,693
8 Claims. (Cl. 260—644)

This invention relates generally to the field of organic chemistry and is particularly directed to an improved process of making hexanitroethane.

Hexanitroethane is a compound which has been known for some years, having been reported in 1914 by Will who first synthesized it. Since this original work, little has been reported in the literature.

The inventors have found that hexanitroethane is of considerable interest as an oxidizer, particularly when used in connection with fuel materials in rocket engines and the like. In this regard, we have found that hexanitroethane is compatible with such fuel materials as aluminum, magnesium hydride, and even lithium aluminium hydride although the latter composition is extremely sensitive to shock.

In addition to its use as an oxidizer, hexanitroethane also has utility in connection with various chemical reactions, it being noted that in ether solution it will oxidize hydroquinone to quinone much more rapidly than will tetranitromethane according to the following reaction.

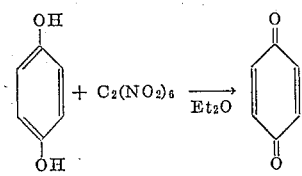

The material also has interesting possibilities as an explosive although we believe its immediate primary utility is in connection with rocket engines where it aids in increasing performance and specific impulse. In general, hexanitroethane reacts with basic materials undergoing degradation and may readily be converted back to dipotassium tetranitroethane and other products of further denitration. It also forms molecular adducts with aromatic hydrocarbons much in the same manner as tetranitromethane, and under certain conditions it may also serve as an agent for nitration.

While working with hexanitroethane in their laboratories, the inventors have noted that it seemed to cause one or more of the following symptoms: (1) smarting of eyes from contact with vapor, (2) severe headaches, and (3) coughing spells and tightness of the chest with some difficulty in breathing. The actual physiological effects of hexanitroethane are not known, but until such determinations are officially made, it would appear prudent to handle the material with caution.

Although Will reported the melting point to be 142° C., we have found that material melting up to 155° C. with decomposition may be obtained after recrystallization from a suitable solvent. The impact sensitivity of crystalline hexanitroethane is often greater than one meter using a 2 kg. hammer. The heat of explosion is 750 calories per gram and the explosive power as measured by the lead block expansion test is 117 (reference TNT equals 100). The material is a colorless crystalline solid.

Will first attemtped to prepare hexanitroethane by a simple metathetical reaction which was unsuccessful. This reaction was as follows:

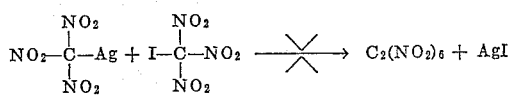

Hexanitroethane may also be prepared in very poor yield from the tetrahaloethylenes according to the following reaction:

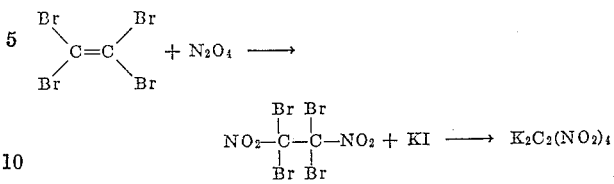

(which may be nitrated to HNE by $HNO_3/H_2SO_4$).

It is noted the chloro and fluoro analogs will also work but the mechanism of this transformation is unknown. The method discussed above, in addition to being extremely dangerous, is also comparatively slow and quite expensive.

The present conventional, accepted method of preparing hexanitroethane follows the original work of Will noted above in that a starting material, usually bromopicrin, is converted to dipotassium tetranitroethane by various reagents, following which it is nitrated to hexanitroethane. This method has proven to be extremely dangerous to carry out, especially on a large scale, because it requires the addition of a highly shock sensitive material to a nitrating mixture. The intermediate in this reaction, dipotassium tetranitroethane, must be carefully recrystallized to remove potassium bromide and must also be very dry. It is noted in this regard that the impact sensitivity of dipotassium tetranitroethane is reported to be 8 to 10 centimeters using a 2 kg. hammer. The inventors have experienced difficulty in handling the material due to this highly explosive and sensitive nature.

It is, consequently, a primary object of the subject invention to provide an improved method of synthesizing hexanitroethane which is safe to perform, especially utilizing large quantities, thus effecting a commercially acceptable method of producing the material.

An additional object of the invention is to provide a method of producing hexanitroethane which is faster than previously available methods.

A further purpose of this invention is to provide a method of producing hexanitroethane which is cheaper than previously available methods and which utilizes chemicals which are readily commercially available.

Other objects will appear to those skilled in the art from a consideration of the description hereinbelow.

The production of hexanitroethane according to our invention involves the process of nitrating the dipotassium salt of trinitropropionaldehyde and features the nitration of this material utilizing a slurry of dipotassium trinitropropionaldehyde in methylene chloride, the reaction being conducted at low tempeartures so that a nitrating mix can be added to the slurry safety and rapidly. This eliminates the dangers inherent in handling dry dipotassium tetranitroethane and the propensity to explosion when this material is dropped in dry form into a nitrating mix.

A feature of our invention resides in the fact that we have found hexanitroethane is quite soluble in methylene chloride and that this solution is easily separated from the nitrating mix following which it may be washed until free of acid, dried, filtered, and crystallized, with the additional advantage that the nitrating mix may be reused after reconstitution with relatively small amounts of the fresh acid components.

Hill and Sanger (Proceedings of the American Academy, 15, 10 (1906)) discovered that mucobromic acid may be reacted with $KNO_2$ to yield dipotassium trinitropropionaldehyde. We have discovered that the dipotassium salt of trinitropropionaldehyde may be safely converted to hexanitroethane by treating a fluid suspension of dipotassium trinitropropionaldehyde with a nitrating mix at low temperature. Utilizing our method, we have found that a yield of approximately 90% of theory can be realized, and, since the use of the fluid solvent makes it possible to remove the product and reuse the nitrating mix, a continuous nitration process is provided.

The following are examples of preparation of the potassium salt of trinitropropionaldehyde:

*Example 1*

A solution of 6.76 gms. (0.04 mole) of mucochloric acid in 50 ml. water and 30 ml. of 95% ethanol was treated with 15 gms. (0.164 mole) of solid 93% $KNO_2$ and the temperature was maintained at 5° C. for three hours. 200 mls. of 95% ethanol were then added and the mixture allowed to warm to room temperature and filtered. A yield of 8 gms. of material was obtained and recrystallized from 60% aqueous alcohol to yield 2.8 gms. of dipotassium trinitropropionaldehyde and 5.2 gms. of potassium nitromalondialdehyde.

*Example 2*

A solution of 6.76 gms. (0.04 mole) of mucochloric acid in 45 ml. of 95% ethanol was added all at once and at a temperature of 5° C. to a suspension consisting of 17.35 gms. (0.189 mole) of 93% $KNO_2$ in 30 mls. of water and 20 mls. of 95% ethanol. Crystals appeared after ten minutes. The mixture was stirred for one hour and then filtered to yield 6.8 gms. of material which was recrystallized from 60% aqueous alcohol to yield 2.8 gms. of dipotassium trinitropropionaldehyde and 4.3 gms. of potassium nitromalondialdehyde.

*Example 3*

A solution of 6.76 gms. (0.04 mole) of mucochloric acid in 50 mls. of 95% ethanol was added to a solution of 15 gms. (0.164 mole) of 93% $KNO_2$ in 50 mls. of ethylene glycol and 40 mls. of water. The temperature was maintained at 15° C. and 1 gm. (0.0006 mole) of potassium iodide was added. After one hour, the mixture was filtered to yield 2.4 gms. of dipotassium trinitropropionaldehyde and no by-product of potassium nitromalondialdehyde. Under certain conditions there may also be a quantity of the potassium salt of beta formyl, beta keto, alpha nitro propionic acid from the reactions noted in these examples.

*Example 4*

A solution of 1060 gms. of $KNO_2$ (93% purity) was made in 1220 mls. of 95% ethanol and 1825 mls. of water. 630 gms. of mucobromic acid was dissolved in 2750 mls. of 95% ethanol and this mixture was added to the potassium nitrite solution. The initial temperature of 10° C. to 15° C. gradually rose to about 25° C. while the reaction was stirred over a two-hour period. The bright orange salt was filtered and washed on the filter with successive washes of one liter of 70% ethanol, 2 liters of 95% ethanol, and finally 2 liters of methylene chloride. After drying on the filter, the yield of approximately 466 gms. (71% of theory) of red-orange salt, melting point 250° C. (dec.), was nitrated immediately. The impact sensitivity of this material was 78 centimeters with a 2 kg. hammer.

It is noted that although mucobromic acid is preferred for making the intermediate dipotassium trinitropropionaldehyde, mucochloric acid may have more desirability on a large scale since mucochloric acid is much cheaper than mucobromic, and the by-product of potassium nitromalondialdehyde has some market value of its own, especially as an intermediate in the synthesis of heterocyclic compounds by known reactions.

Examples of preparation of hexanitroethane according to the teachings of the subject invention are exemplified by the following:

*Example 5*

100 gms. (0.372 mole) of dipotassium trinitropropionaldehyde was suspended in 750 mls. of methylene chloride by adding the wet cake to the liquid with stirring and cooled to −60° C. with a Dry Ice acetone bath. 650 mls. of cold fuming red nitric acid was added to this suspension and then a cold mixture of 160 mls. of fuming red nitric acid and 750 mls. of 15% fuming sulphuric acid was added. The total time elapsed during the above steps was 40 minutes. The reaction mixture was allowed to stand in the refrigerator over night (18 hours) and then the acid layer was separated from the methylene chloride solution. The methylene chloride layer was then washed with approximately 5 liters of water until the wash water was practically clear following which it was dried over anhydrous $MgSO_4$ for two hours. On cooling the methylene chloride solution to Dry Ice temperature, 67 gms. of hexanitroethane were obtained (60% yield).

*Example 6*

In a 12 liter flask, 400 gms. of dipotassium trinitropropionaldehyde was suspended in 2 liters of methylene chloride. The suspension was then chilled in an acetone and Dry Ice bath. To this suspension was added 2 liters of precooled (−60° C.) red fuming nitric acid ($d=1.59$ g./cc.). The temperature rose initially but was maintained below −45° C. by careful control of the rate of addition. A precooled (−40° C.) mixture of 3500 mls. of red fuming nitric acid and 3375 mls. of 30% fuming sulphuric acid was then added at such a rate that the final temperature reached was approximately −20° C. The reaction mixture was placed in a refrigerator at 5° C. and allowed to stand approximately 18 hours.

After warming to room temperature, the lower acid layer was siphoned off and the methylene chloride layer washed with water until the washings were only pale yellow (about 20 liters of water). The methylene chloride solution was then stirred with anhydrous magnesium sulphate to remove the water, filtered, and the filtrate chilled with a methylene chloride/Dry Ice bath to crystallize the hexanitroethane. This was filtered cold on a sintered glass filter funnel, covered with polytetrafluoroethylene film and sucked dry on the filter. There was obtained approximately 400 gms. of hexanitroethane with a melting point of 150° C. (dec.). This was a yield of 90% of theory. The separated nitrating mix was replenished for a second nitration.

*Example 7*

100 gms. of potassium trinitropropionaldehyde was suspended in 800 milliliters of chloroform and cooled to 55° C. with a Dry Ice acetone bath. 650 milliliters of cold fuming red nitric acid was added and then a cold mixture of 160 milliliters of fuming red nitric acid and 750 milliliters of 15% fuming sulphuric acid was added. This combination took place over a period of approximately 35 minutes. The reaction mixture was allowed to stand for approximately 18 hours in the refrigerator and then the acid layer was separated from the chloroform solution. The chloroform layer was washed with water until the wash water was practically clear (approximately 5 liters) and was then dried over anhydrous $MgSO_4$ for approximately 2 hours. On cooling to Dry Ice temperatures, a yield of 66 gms. of hexanitroethane was obtained which approximates a 60% yield.

In general it has been found that optimum results are obtained when a mixture of approximately equal parts of nitric acid and sulphuric acid components are utilized. The nitric acid component may be 90% white fuming nitric acid and red fuming acid containing up to saturation amounts of dissolved $NO_2$. Regarding sulphuric acid, best results were obtained with and acid blend of 95% sulphuric acid and 65% fuming sulphuric acid to produce a 30% fuming sulphuric acid.

While the nitrating mixture is often added in two portions, we have found that it may be added to the solvent suspension of KTNP all at one time. This is especially true if the solution is maintained at lower temperatures. An advantage which we have found is in utilizing the "spent" nitrating mix which has already undergone primary heat of mixture so that it may be "rejuvenated" with small amounts of red fuming nitric and sulphuric acids quickly without attaining too high a temperature. This is especially advantageous in continuous large quantity operation.

The inventors have exercised care in keeping the reacting mixture below a temperature of approximately −20° C. since it was found that $NO_2$ was lost as a gas from the reaction mixture as higher temperatures were attained and the yield was lower. Additionally, temperatures should be kept in lower regions because of the possibility of explosive reaction.

While certain preferred embodiments of the invention have been specifically disclosed, it is to be understood that variations therefrom may be readily apparent to those skilled in the art, and the invention is to be given the broadest interpretation within the terms of the following claims, wherein we claim:

1. The process of making hexanitroethane which comprises the steps of suspending dipotassium trinitropropionaldehyde in a liquid which is a solvent for hexanitroethane, selected from the group consisting of methylene chloride and chlorform, adding a nitrating mix selected from the group consisting of nitric acid, fuming nitric acid, nitric acid in combination with sulphuric acid, fuming nitric acid in combination with sulphuric acid, nitric acid in combination with fuming sulphuric acid, and fuming nitric acid in combination with fuming sulphuric acid to said suspension, maintaining said mixture substantially below room temperature during nitration, and after the nitration reaction is substantially complete, recovering hexanitroethane from said mixture.

2. The process of making hexanitroethane as claimed in in claim 1 in which said solvent is methylene chloride.

3. The process of making hexanitroethane as claimed in claim 1 in which said solvent is chlorform.

4. The process of making hexanitroethane which comprises the steps of suspending dipotassium trinitropropionaldehyde in a liquid which does not react with hexanitroethane and which has a freezing point below −45° C. and a boiling point above +30° C., adding thereto a precooled nitrating agent selected from the group consisting of nitric acid, fuming nitric acid, nitric acid in combination with sulphuric acid, fuming nitric acid in combination with sulphuric acid, nitric acid in combination with fuming sulphuric acid, and fuming nitric acid in combination with fuming sulphuric acid while maintaining the resulting mix at a temperature below approximately −20° C., and, after nitration is substantially complete, removing the liquid layer, washer said layer, drying said layer, and cooling the same to crystallize hexanitroethane.

5. The process of making hexanitroethane as claimed in claim 4 in which said fluid is methylene chloride.

6. The process of making hexanitroethane which comprises the steps of suspending an amount of the dipotassium salt of trinitropropionaldehyde in a liquid which is a solvent for hexanitroethane selected from the group consisting of methylene chloride and chloroform, cooling said suspension to at least −40° C., nitrating said salt by adding first a precooled quantity of fuming red nitric acid and then a precooled substantially equal mixture of red fuming nitric acid and 30% fuming sulphuric acid to said suspension while maintaining the temperature thereof during the nitration step below approximately −20° C., and, after nitration is substantially complete, removing the suspension layer from the acid layer, washing said suspension layer, drying the same, and cooling the same to crystallize hexanitroethane therefrom.

7. The process for making hexanitroethane as claimed in claim 6 in which said fluid is methylene chloride.

8. The process of making hexanitroethane comprising the steps of adding a quantity of an acid selected from the group consisting of mucobromic and mucochloric acid to a quantity of potassium nitrite in an approximate mole ratio of at least 1 to 4, respectively while maintaining the reaction mixture below approximately 15° C., and, upon completion, separating the dipotassium salt of trinitropropionaldehyde therefrom, suspending said salt in methylene chloride, adding a nitrating mix selected from the group consisting of nitric acid, fuming nitric acid, nitric acid in combination with sulphuric acid, fuming nitric acid in combination with sulphuric acid, nitric acid in combination with fuming sulphuric acid, and fuming nitric acid in combination with fuming sulphuric acid to said suspension while maintaining the reaction mixture at a temperature below approximately 0° C., and, after reaction is complete, recovering hexanitroethane therefrom.

No references cited.